United States Patent
Tanaka

(10) Patent No.: US 7,853,816 B2
(45) Date of Patent: Dec. 14, 2010

(54) APPARATUS, SYSTEM AND METHOD FOR MONITORING AND MANAGING THE SUPPLY OF POWER TO A PLURALITY OF UNITS CONNECTED TO A POWER SUPPLY

(75) Inventor: Yoshimasa Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 735 days.

(21) Appl. No.: 11/757,551

(22) Filed: Jun. 4, 2007

(65) Prior Publication Data

US 2007/0288774 A1    Dec. 13, 2007

(30) Foreign Application Priority Data

Jun. 7, 2006    (JP) .................... 2006-158450

(51) Int. Cl.
*G06F 1/26* (2006.01)

(52) U.S. Cl. .................. 713/323; 713/322; 713/324; 713/340

(58) Field of Classification Search ............ 713/322, 713/323, 324, 340
See application file for complete search history.

(56) References Cited

U.S. PATENT DOCUMENTS

| | | | | |
|---|---|---|---|---|
| 6,618,811 B1* | 9/2003 | Berthaud et al. | ............ | 713/300 |
| 6,625,736 B1* | 9/2003 | Berthaud et al. | ............ | 713/300 |
| 7,111,178 B2* | 9/2006 | Rusu et al. | ............ | 713/300 |
| 7,206,944 B2* | 4/2007 | Odaohhara et al. | ............ | 713/300 |
| 7,265,852 B2* | 9/2007 | Goto et al. | ............ | 358/1.14 |
| 7,549,067 B2* | 6/2009 | Tolliver | ............ | 713/320 |
| 7,561,977 B2* | 7/2009 | Horst et al. | ............ | 702/62 |
| 7,698,580 B2* | 4/2010 | Schindler et al. | ............ | 713/300 |
| 2003/0065960 A1* | 4/2003 | Rusu et al. | ............ | 713/300 |
| 2003/0126479 A1* | 7/2003 | Burns et al. | ............ | 713/300 |
| 2005/0102544 A1* | 5/2005 | Brewer et al. | ............ | 713/320 |
| 2005/0187727 A1* | 8/2005 | Weik et al. | ............ | 702/61 |
| 2005/0289371 A1* | 12/2005 | Makiyama et al. | ............ | 713/300 |
| 2006/0156042 A1* | 7/2006 | Desai et al. | ............ | 713/300 |
| 2006/0190755 A1* | 8/2006 | Kim | ............ | 713/400 |
| 2007/0016814 A1* | 1/2007 | Rusu et al. | ............ | 713/320 |
| 2007/0204181 A1* | 8/2007 | Tsuji | ............ | 713/320 |
| 2008/0178032 A1* | 7/2008 | Walrath | ............ | 713/340 |
| 2008/0215901 A1* | 9/2008 | Beard | ............ | 713/300 |
| 2009/0234980 A1* | 9/2009 | Barrenscheen et al. | ............ | 710/18 |
| 2009/0319808 A1* | 12/2009 | Brundridge et al. | ............ | 713/300 |

FOREIGN PATENT DOCUMENTS

JP    2004-208393 A    7/2004

* cited by examiner

*Primary Examiner*—Thomas Lee
*Assistant Examiner*—Zahid Choudhury
(74) *Attorney, Agent, or Firm*—Sughrue Mion, PLLC

(57) ABSTRACT

An apparatus connected to a plurality of units, said units include monitors, respectively, each of which monitors power consumption of the corresponding one of said units, includes a management unit which changes operation statuses of each of said units according to said power consumption obtained from the corresponding one of said monitors, within every operating range of said units.

19 Claims, 15 Drawing Sheets

| | POWER CONSUMPTION | | |
|---|---|---|---|
| | LOW | MEDIUM | HIGH |
| OPERATION STATUS | NORMAL MODE | POWER-SAVING MODE | POWER-SAVING MODE |

FIG. 6A

|   | PRIORITY | | |
|---|---|---|---|
| POWER CONSUMPTION | HIGH-PRIORITY | MEDIUM-PRIORITY | LOW-PRIORITY |
| HIGH | RANK7 | RANK8 | RANK9 |
| MEDIUM | RANK4 | RANK5 | RANK6 |
| LOW | RANK1 | RANK2 | RANK3 |

FIG. 6B

|   | PRIORITY | | |
|---|---|---|---|
| POWER CONSUMPTION | HIGH-PRIORITY | MEDIUM-PRIORITY | LOW-PRIORITY |
| HIGH | RANK3 | RANK6 | RANK9 |
| MEDIUM | RANK2 | RANK5 | RANK8 |
| LOW | RANK1 | RANK4 | RANK7 |

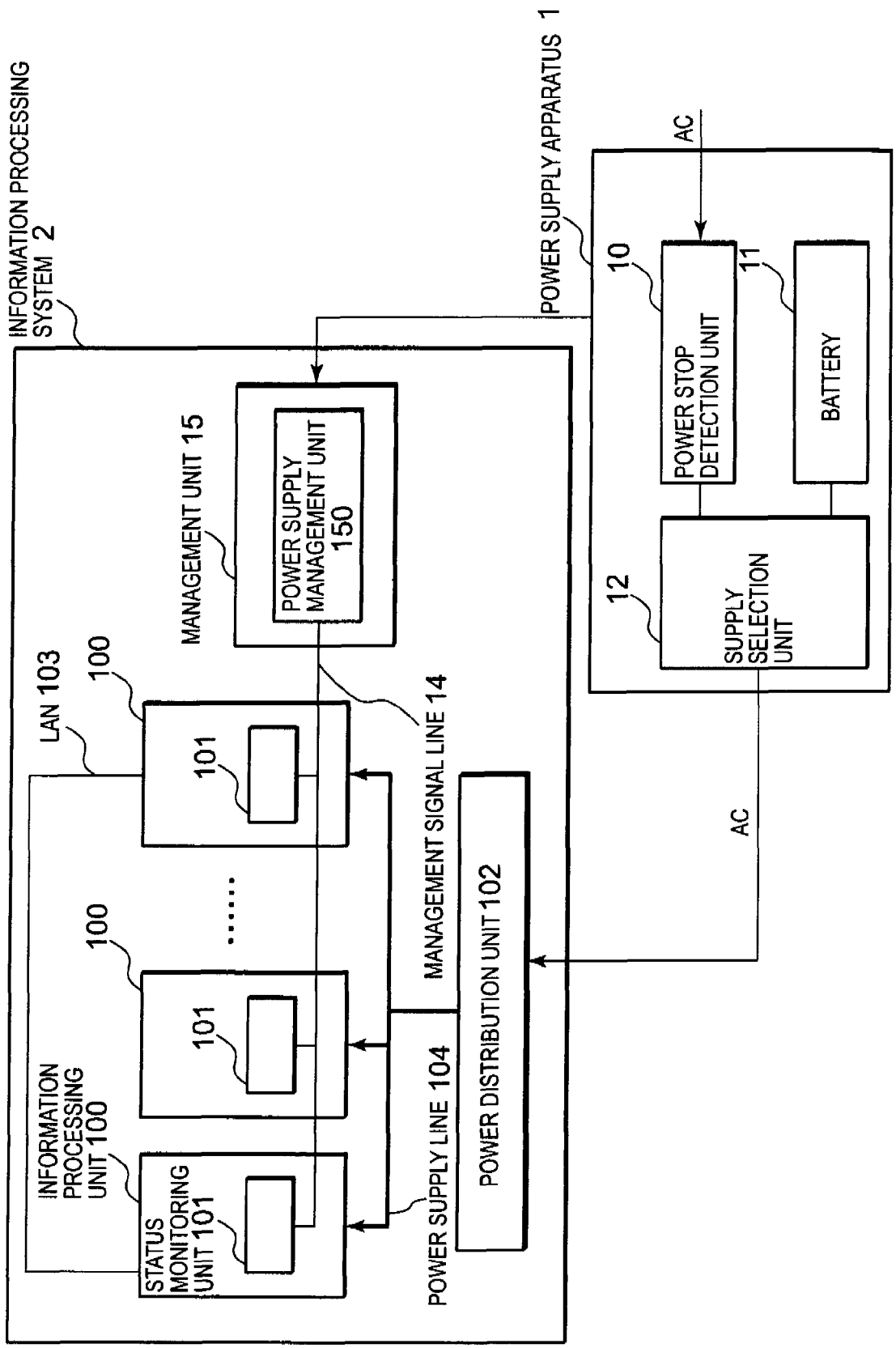

FIG. 14

| | | REQUIRED OPERATION TIME (h) |
|---|---|---|
| REMAINING AMOUNT (Wh) | 3k~2k | 2.0 |
| | 2k~1k | 1.5 |
| | 1k~0.5k | 1.0 |
| | 0.5k~0.3k | 0.5 |

APPARATUS, SYSTEM AND METHOD FOR MONITORING AND MANAGING THE SUPPLY OF POWER TO A PLURALITY OF UNITS CONNECTED TO A POWER SUPPLY

BACKGROUND OF THE INVENTION

The present invention relates to a power supply apparatus for supplying a power to various units and controlling an operation status of the unit.

Each of the related power supply apparatus assigns a rank to the unit to be supplied a power therefrom and supplies the power to the unit according to the rank.

The apparatus disclosed in Japanese Patent Application Laid-open No. 2004-208393 stops a power supply to load processing units of lower rank in case where the load of the load processing unit exceeds a predetermined value. Because the power supply to the load processing units of low ranks is stopped such way, the power can be kept supplied to other load processing units of higher ranks even when the system load is varied due to such a factor as an increase of the number of the processing units to be supplied a power.

SUMMARY OF THE INVENTION

In the related power supply apparatus as described above, the power supply to the load processing units of low ranks is stopped. Therefore, the operational flexibility of the processing units is decreased. This is a problem of the related power supply apparatus.

An exemplary object of this invention is to avoid the problem.

According to one aspect of the present invention, an apparatus connected to a plurality of units, the units include monitors, respectively, each of which monitors power consumption of the corresponding one of units, includes a management unit which changes operation statuses of each of the units according to the power consumption obtained from the corresponding one of the monitors, within every operating range of the units.

According to another aspect of the present invention, a system, includes a plurality of unit each of which include a monitor for monitoring power consumption of the corresponding one of the units, an apparatus which is connected to each of the units, the apparatus includes a management unit which changes operation statuses of each of said units according to said power consumption obtained from the corresponding one of said monitors, within every operation range of said units.

BRIEF DESCRIPTION OF THE DRAWINGS

Other features and advantages of the invention will be made more apparent by the following detailed description and the accompanying drawings, wherein:

FIG. 6A explains an operation of the first exemplary embodiment of the present invention;

FIG. 6B also explains the operation of the first exemplary embodiment of the present invention;

FIG. 7 is a block diagram of another configuration of the system in the first exemplary embodiment of the present invention;

FIG. 14 explains an operation of the second exemplary embodiment of the present invention;

In the drawings, the same reference numerals represent the same structural elements.

DETAILED DESCRIPTION OF THE PREFERRED EMBODIMENTS

Hereunder, exemplary embodiments of the present invention will be described in detail with reference to the accompanying drawings.

Figure 1:
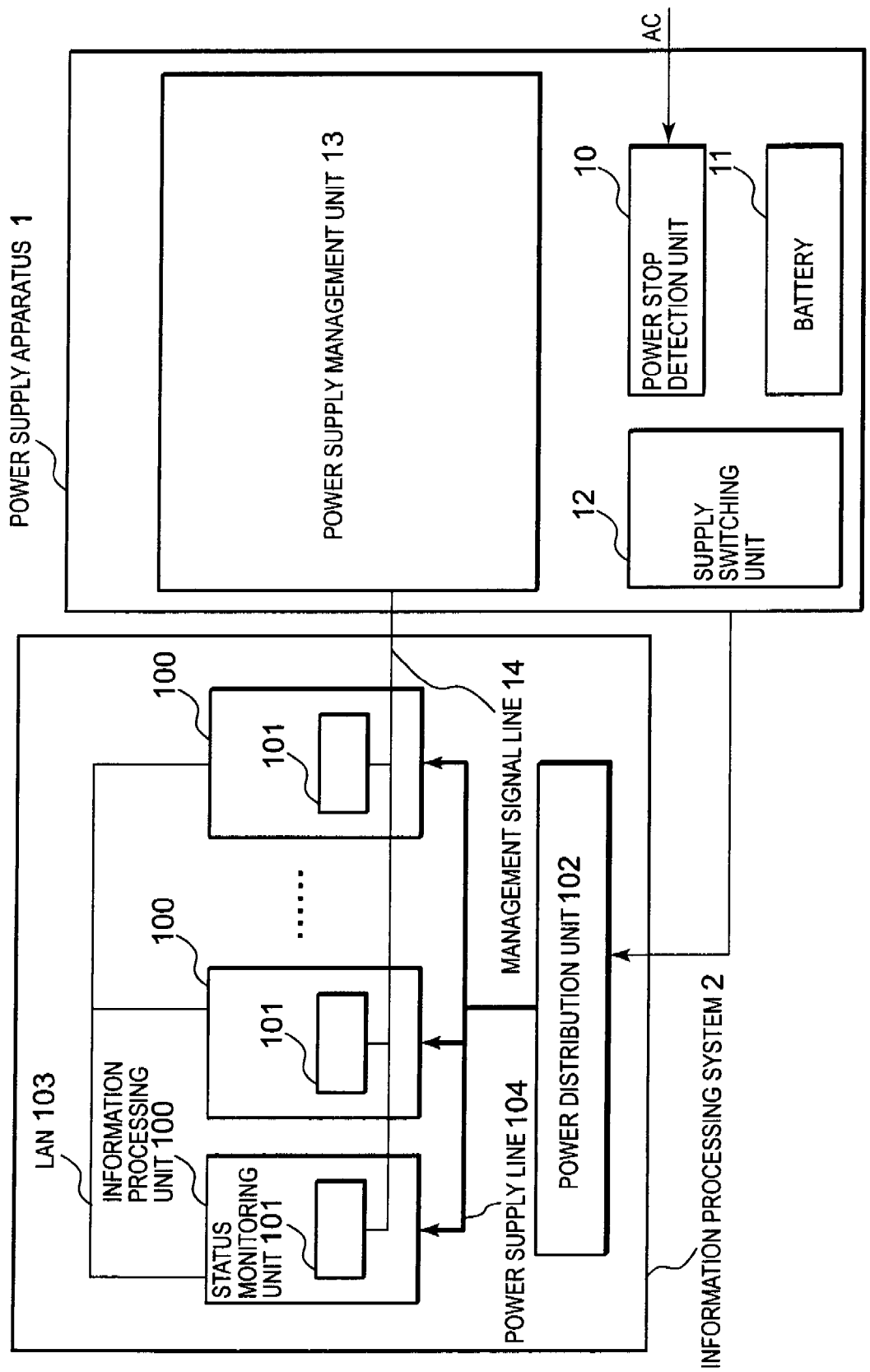
FIG. 1 is a block diagram of a configuration of a system in a first exemplary embodiment of the present invention.

FIG. 1 shows a configuration of the first exemplary embodiment of the present invention. The system shown in FIG. 1 includes an information processing system 2 including a plurality of information processing units 100 and a power supply apparatus 1 for supplying a power to the information processing system 2. However, the present invention is not limited only to the system. For example, any unit to be driven by a power may be connected to the power supply system 1. The unit is not limited to the information processing system 2 and the plurality of information processing units 100.

The power supply apparatus 1 is connected to a power distribution unit 102 for distributing a power to each of information processing units 100 and supplies a power to the power distribution unit 102. The power distribution unit 102 distributes a power to each of information processing units 100 through a power supply line 104.

The plurality of information processing units 100 are connected to each another through a LAN (Local Area Network) 103. However, The LAN 103 is not limited to the Local Area Network.

The power supply apparatus 1 includes a power stop detection unit 10, a battery 11, a supply switching unit 12, and a power supply management unit 13.

The power supply apparatus 1 is provided between an AC (Alternating Current) power supply connected and the power distribution unit 102. Usually, the power supply apparatus 1 supplies a power to the power distribution unit 102 through the AC power supply. Upon the stop of the power from the AC power supply, the power supply apparatus 1 uses the battery 11 to supply the power to the power distribution unit 102. While the AC power supply is supplying its power, the power supply apparatus 1 charges the battery 11.

The power stop detection unit 10 detects a stop of the AC power supply to be caused by a power failure, etc.

The supply switching unit 12 switches between the power supply from the AC power supply and the power supply from the battery 11. Upon the detection of an AC power supply stop, the power stop detection unit 10 switches from the AC power supply to the battery 11 to keep the power supply.

The power supply management unit 13 monitors the power consumption of each of the information processing units 100. In case where the power supply to the power supply apparatus 1 stops, the battery 11 supplies the power instead of the AC power supply. In this case, the power supply management unit 13 changes the operation status of each of the information processing units 100 according to the power consumption thereof, thereby adjusting the power consumption. The power supply management unit 13 is connected to the status monitoring unit 101 provided in each of the information processing units 100. The power supply management unit 13 is connected to the status monitoring unit 101 through a management signal line 14 separately from the LAN 103 and the power supply line 104. Because the power supply management unit 13 is separated from the LAN 103 that is a network used by the user of the information processing units 100, the security is improved. In other words, because an important information related to the operation status of the information processing unit 100 is separated form the user access, the security is improved.

The status monitoring unit 101 monitors the power consumption of each of the information processing units 100. The status monitoring unit 101 may be configured as a hardware monitor on the basis of the IPMI (Intelligent Platform Management Interface) specifications, for example. The specification is not limited to the IPMI. In this case, the management signal line 14 may be comprised of the IPMI specifications. The status monitoring unit 101 monitors the usage rate of the CPU of each of the information processing units 100 according to the IPMI specifications, for example. The status monitoring unit 101 holds the maximum power consumption value at a usage rate of 100%. The status monitoring unit 101 roughly calculates a power consumption value of each of the information processing units 100 from the CPU usage rate and the maximum power consumption value. For example, if the maximum power consumption value of a CPU is 100 W and its usage rate is 90%, the power consumption is assumed to be 90 W. Because the CPU power consumption is dominant in the power consumption of each of the information processing units 100, a rough power consumption value of each of the information processing units 100 can be obtained by calculating the CPU power consumption.

Figure 2:
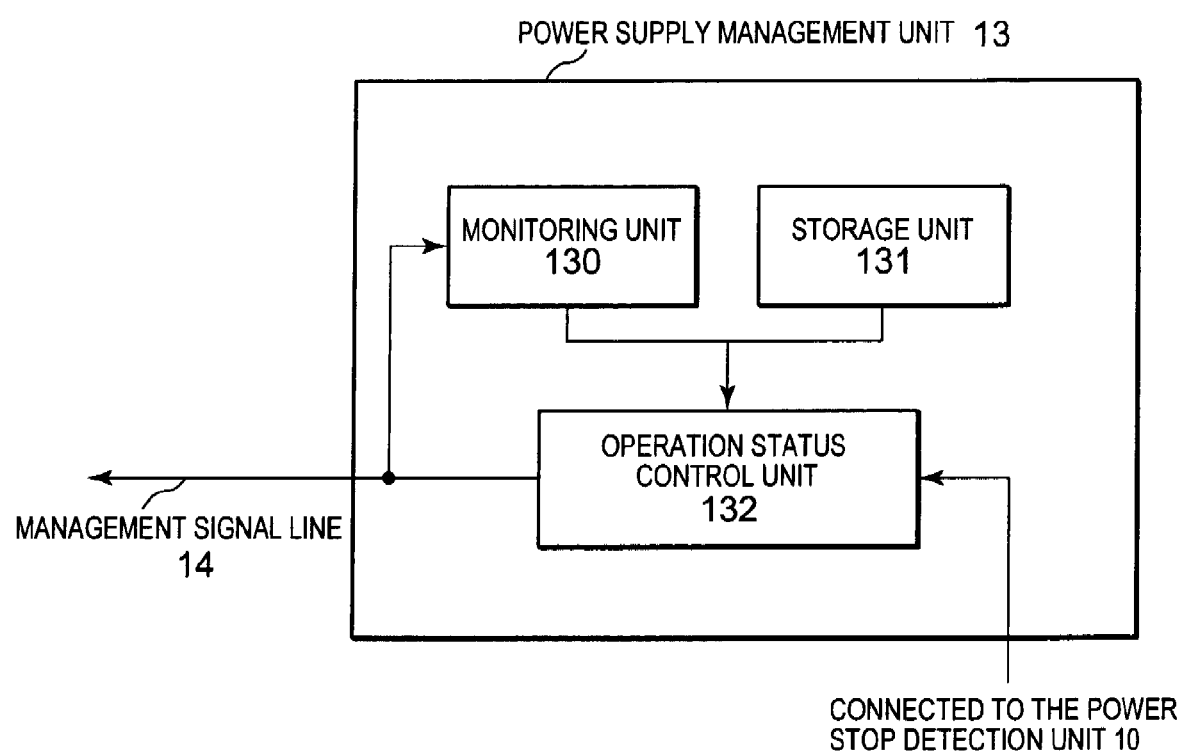
FIG. 2 is a block diagram of a configuration of a power supply management unit in the first exemplary embodiment of the present invention.

As shown in FIG. 2, the power supply management unit 13 includes a monitoring unit 130, a storage unit 131, and an operation status control unit 132.

The monitoring unit 130 obtains the power consumption of each of the information processing units 100 collected by the status monitoring unit 101. The monitoring unit 130 holds a power consumption value of each of the information processing units 100. The monitoring unit 130 obtains a power consumption value from the status monitoring unit 101 periodically at predetermined intervals.

The storage unit 130 sets and records a priority level of each of the information processing units 100, which denotes a necessity level to maintain a current operation status for each of the information processing units 100. It means that higher the priority level of the information processing unit 100 is, the higher the necessity level of the information processing unit 100 becomes. For example, the priority level may be represented by numerals of 1 to 10, although the setting of the priority is not limited to the manners. The priority level may be set for each of the information processing units 100 in advance or may be changed as needed under the operating conditions of the power supply apparatus 1.

The operation status control unit 132 changes an operation status of each of the information processing units 100 to adjust the power consumption thereof. Upon the stop of power supply from the AC power supply due to such a factor as a power failure, the operation status control unit 132 receives a notice indicating that the power supply stops, from the power stop detection unit 10. Receiving the notice, the operation status control unit 132 changes the operation status of each of the information processing units 100, thereby adjusting the power consumption thereof.

Figure 3:
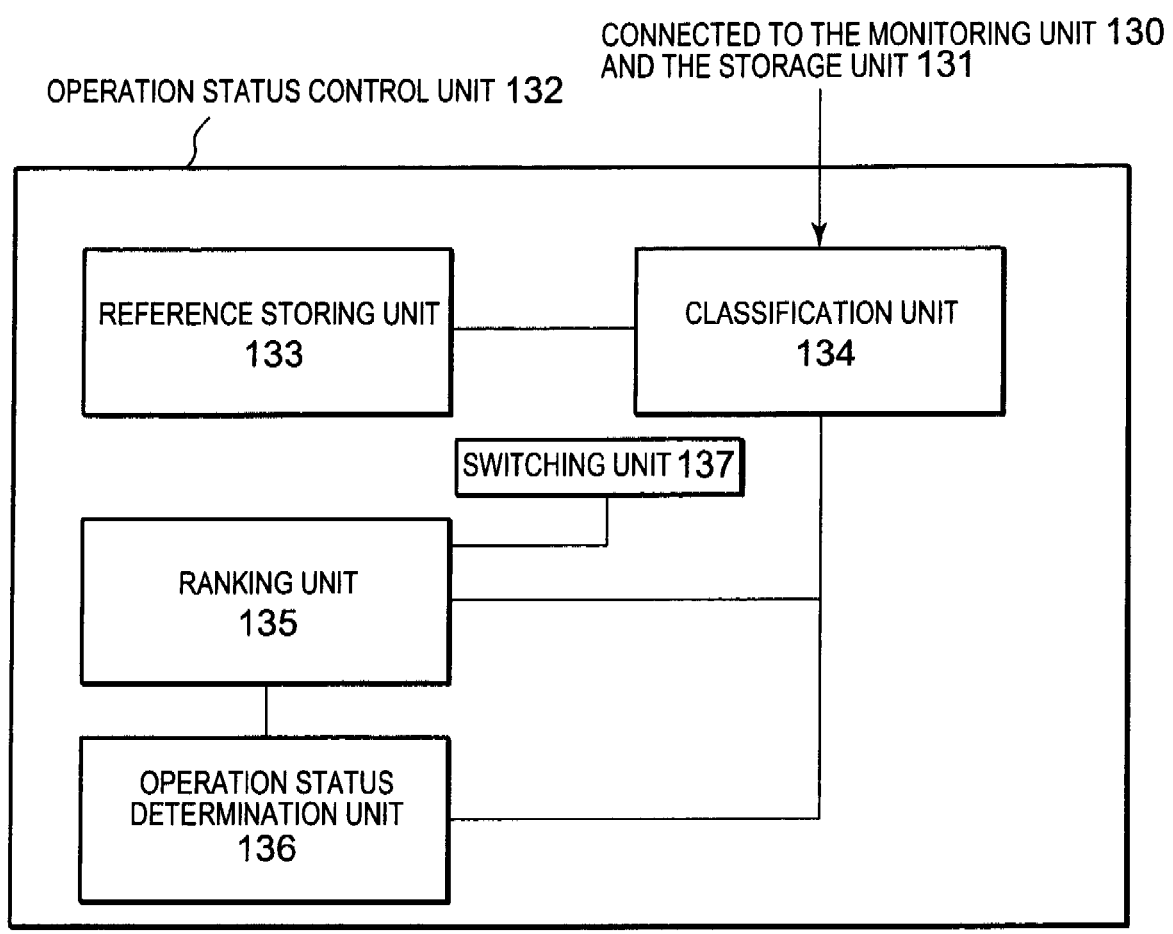
FIG. 3 is a block diagram of a configuration of an operation status control unit in the first exemplary embodiment of the present invention.

As shown in FIG. 3, the operation status control unit 132 includes a reference storing unit 133, a classification unit 134, a ranking unit 135, an operation status determination unit 136, and a switching unit 137.

Next, with reference to FIG. 3, a description will be made for how the operation status control unit 132 changes an operation status of each of the information processing units 100 according to a power consumption value obtained by the monitoring unit 130. The operation status control unit 132 changes the operation status at predetermined time intervals, for example. This time interval may be set in the operation status control unit 132 in advance or may be changed as needed while the power supply apparatus 1 is operating.

The reference storing unit 133 stores a reference. The reference is used for classifying each of the information processing units 100 into categories according to their power consumption values obtained by the monitoring unit 130. The reference stored by the reference storing unit 133 is set according to the power supply capability of the power supply apparatus 1. For example, the reference storing unit 133 calculates an upper value of the power consumption allowed for each of the information processing units 100 from the limit value of the power supply capability of the power supply apparatus 1. Then, the reference storing unit 133 generates and stores such reference used for classifying each of the information processing units 100 according to the upper value. For example, if 100 W is the allowed upper value of the power consumption for a certain information processing unit 100 and "x" is assumed as power consumption, the reference storing unit 133 may generate and store three references of x≧100 W, 80 W≦x<100 W, and x<80 W.

The classification unit 134 classifies each of the information processing units 100 into a predetermined category according to its power consumption stored in the monitoring unit 130 and the reference stored in the reference storing unit 133. For example, the reference storing unit 133 may be configured to store the reference to determine that the power consumption of each of the information processing units 100 is high, medium or low. In this case, the categories are defined as "high", "medium" and "low". The classification unit 134 may be configured to compare the power consumption of each of the information processing units 100 stored in the monitoring unit 130 with the reference stored in the reference storing unit 133 to classify each of the information processing units 100 into any categories "high", "medium", and "low", according to the power consumption of each of the information processing units 100. For example, in case where the reference storing unit 133 stores three references of $x \geq 150$ W, $100\,W \leq x < 150\,W$, and $x > 100\,W$ and the power consumption value is assumed as x, if the power consumption of a certain information processing unit 100 is over 150 W, it may be classified as "high". If the power consumption is over 100 W and under 150 W, it may be classified as "medium", and if the power consumption is under 100 W, it may be classified as "low". This is an example and the classification method of the present invention may also be varied freely. The three references stored in the reference storing unit 133 may be further divided into more references, and the number of categories may be further increased. For example, the classification unit 134 may divide the three steps categories of "high", "medium", and "low" into 10 steps categories.

The operation status determination unit 136 changes the operation status of each of the information processing units 100 according to the category to which it belongs, thereby adjusting the power consumption of the information processing unit 100. For example, the operation status determination unit 136 changes the operation status of each of the information processing units 100 by adjusting the operation frequency of the information processing unit 100. And by lowering the operation frequency, the power consumption of the information processing unit 100 can be suppressed. Furthermore, the power consumption can be adjusted according to how much the operation frequency is adjusted. To make such adjustment of an operation frequency, for example, it may be provided a plurality of oscillators for supplying a clock to each of a CPU, each of the oscillators has a different clock speed respectively. And, each of the oscillators is configured so as to be switched from one to another. Also, it is possible that each of the oscillators is configured to be able to adjust the operation frequency within a range of an adjustable operation frequency set on each of the oscillators in advance. The operation status determination unit 136 controls the operation frequency of each of the information processing units 100 through the management signal line 14. While the operation frequency is adjusted to adjust the power consumption of the information processing unit 100 in the exemplary example described above, the method for adjusting the power consumption of the information processing unit 100 is not limited only to the exemplary example described above. Hereinafter, in case where the information processing unit 100 operates with the adjusted power consumption, the operation status will be referred to as "power saving mode".

The operation status determination unit 136 may be configured so as to store an adjustable range of the operation frequency of each unit 100 in advance. Although the power consumption can be suppressed by setting a lower operation frequency, this might cause the processing performance of the information processing unit 100 to be suppressed excessively and disturb the operation of the information processing system 2. So as not to disturb the minimum processing performance of each of the information processing units 100, therefore, the adjustable range of the operation frequency should be preset. This makes it possible to obtain an excellent effect that the operation of the information processing system 2 can be continued while suppressing the power consumption of each of the information processing units 100.

Figures 4, 5:
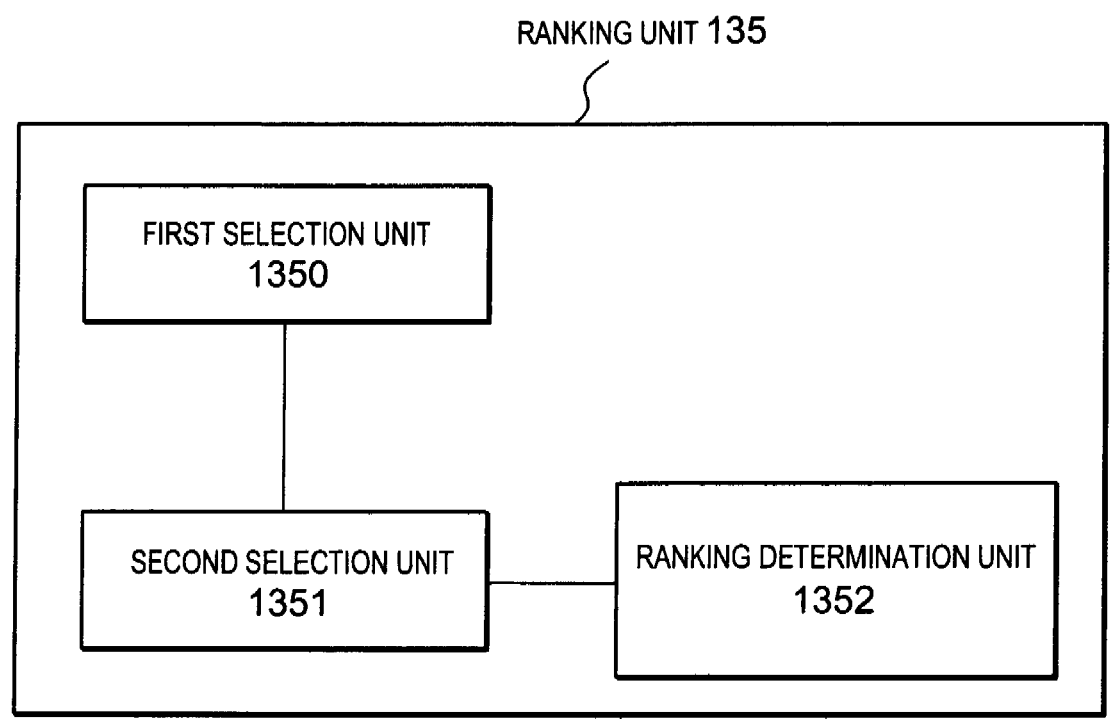
FIG. 4 explains an operation of the first exemplary embodiment of the present invention.
FIG. 5 is a block diagram of a configuration of a ranking unit in the first exemplary embodiment of the present invention.

Next, a description will be made in detail for how the operation status control unit 132 changes an operation status of each of the information processing units 100 with reference to FIG. 4. FIG. 4 shows just a exemplary example. The present invention is not limited only to the example.

The classification unit 134 determines the three categories "high", "medium", and "low" according to the references stored in the reference storing unit 133. According to which categories of "high", "medium" and "low" the power consumption of the information processing unit 100 belongs to, the classification unit 134 classifies each of the information processing units 100 into one of those categories.

The operation status determination unit 136 does not change the operation status of each of the information processing units 100 belonging to the "low" category and enables the information processing unit 100 to continue the operation as is, for example. The operation status determination unit 136 changes the operation statues of the information processing unit 100 belonging to the "medium" and "high" categories to "power saving mode", thereby adjusting their power consumption, for example. For the units 100 belonging to the "high" category, the operation status determination unit 136 makes the operation frequencies of the information processing unit 100 belonging to the "high" category lower than those of the information processing unit 100 belonging to the "medium" category.

By monitoring the power consumption of each of the information processing units 100 and changing its operation status according to the monitored power consumption such way, the power consumption of each of the information processing units 100 can be adjusted not to exceed the power supply capability of the power supply apparatus 1. This is why the present invention can obtain an effect that the information processing system 2 can operate within a range of the power supply capability of the power supply apparatus 1. Particularly, in case where the power supply apparatus 1 supplies a power with use of the battery 11, the power of the battery 11 is limited. In such a case, the effect that the power consumption of each of the information processing units 100 can be adjusted such way will be very significant.

Next, a description will be made for how the operation status control unit 132 adjusts an operation status of each of the information processing units 100 according to the power consumption obtained by the monitoring unit 130 and the priority stored in the storage unit 131 with reference to FIGS. 3 and 5. The operation status control unit 132 makes such adjustments at predetermined time intervals. These time intervals may be set on the operation status control unit 132 in advance or may be changed as needed while the power supply apparatus 1 is operating.

In this case, the ranking unit 135 and the switching unit 137 are used. As shown in FIG. 5, the ranking unit 135 has a first selection unit 1350, a second selection unit 1351, and a ranking determination unit 1352.

The reference storing unit 133 further stores a reference related to the priority denoting a necessity level to maintain a current operation status for each of the processing units 100.

The classification unit 134 uses the two kinds of references stored in the reference storing unit 133 to classify each of the information processing units 100. For example, the reference storing unit 133 may be configured to have a reference of the power consumption for determining "high", "medium", and "low" categories and the other reference of priority for determining "high priority", "medium priority", and "low priority" categories. In case where the priority is represented as 10 steps (1 to 10) and P is assumed as the priority, the reference storing unit 133 may store such three references as $P \geq 7$, $4 \leq P < 7$, and $P < 4$, for example. The classification unit 134 determines that the priority belongs to "high priority" for $P \geq 7$, "medium priority" for $4 \leq P < 7$, and "low priority" for $P < 4$ respectively, for example. The classification unit 134 then compares the power consumption stored in the monitoring unit 130 for each of the information processing units 100 and the priority stored in the storage unit 131 for each of the information processing units 100 with the two kinds of references stored in the reference storing unit 133. After that, the classification unit 134 classifies each of the information processing units 100 into any of the "high", "medium", and "low" categories of power consumption. Similarly, the classification unit 134 classifies each of the information processing units 100 into any of the "high priority", "medium priority", and "low priority" categories of priority. Such way, the classification unit 134 classifies each of the information processing units 100 into those two kinds of categories. Hereunder, the category corresponding to the power consumption will be referred to as a first category and the category corresponding to the priority will be referred to as a second category. Actually however, this method is just a exemplary example. It is possible that the three references stored in the reference storing unit 133 may be divided into more detailed references, for example.

The ranking unit 135 assigns a rank to each of the information processing units 100 according to the classification result by the classification unit 134 and the operation status determination unit 136 changes the operation status of the information processing unit 100 according to the rank, thereby adjusting the power consumption of the information processing unit 100. For example, the operation status determination unit 136 adjusts the operation frequency of each of the information processing units 100, thereby changing the operation status thereof.

The ranking unit 135 includes the first selection unit 1350, the second selection unit 1351, and the ranking determination unit 1352 as shown in FIG. 5, which are used to assign the rank to each of the information processing units 100 according to the category into which each of the information processing units 100 is classified by the classification unit 134.

At first, a description will be made for how the ranking unit 135 assigns the rank to each of the information processing units 100 according to the power consumption and the priority with reference to FIG. 6A. The assignment made by the ranking unit 135 is a power consumption-oriented.

The first selection unit 1350 selects the first category and extracts each of the information processing units 100 belonging to the lowest power consumption category. At this time, in case where there are a plurality of the information processing units 100 belong to the same category, those information processing units 100 are extracted collectively. After that, the first selection unit 1350 notifies the second selection unit 1351 of the extracted information processing units 100. In FIG. 6A, the first selection unit 1350 selects the "low" category denoting the lowest power consumption and extracts each of the information processing units 100 belonging to the category and notifies the second selection unit 1351 of the extracted information processing units 100.

After that, the second selection unit 1351 selects the second category in descending order of the priority with respect to the information processing unit 100 notified from the first selection unit 1350, and extracts each of the information processing units 100 belonging to the selected second category as often as one second category is selected. If there are a plurality of the information processing units 100 belonging to the same category at that time, those information processing units 100 are extracted collectively. As shown in FIG. 6A, with respect to the information processing unit 100 extracted by the first selection unit 1350 and belonging to the "low" category, the second selection unit 1351 extracts each of the information processing units 100 step-by-step from the information processing units 100 belonging to "high priority" category to the information processing units 100 belonging to "low priority" category.

The second selection unit 1351 then notifies the ranking determination unit 1352 of the extracted information processing units 100 sequentially. If there are a plurality of the information processing units 100 belonging to the same category at that time, the second selection unit 1351 notifies those information processing units 100 collectively. As shown in FIG. 6A, the second selection unit 1351, upon the extraction of the information processing units 100 belonging to the "high priority" category, notifies the ranking determination unit 1352 of the extracted information processing units 100 before extracting the information processing units 100 belonging to the "medium priority" category.

The ranking determination unit 1352 assigns the rank to each of the information processing unit 100 in descending order of notification from the second selection unit 1351. As shown in FIG. 6A, the ranking determination unit 1352 assigns the top rank (rank 1) to each of the information processing units 100 belonging to both the "low" category and the "high priority" category. After that, the ranking determination unit 1352 assigns ranks to the information processing units 100 in descending order of the priority. Upon the notification from the second selection unit 1351 to the ranking determination unit 1352 of all the units 100 extracted by the first selection unit 1350, the second selection unit 1351 selects the first category corresponding to the next lower power consumption and extracts each of the information processing units 100 belonging to the selected first category.

After that, the first selection unit 1350, the second selection unit 1351 and the ranking determination unit 1352 repeat the above mentioned process until the rank is given to every unit 100.

Upon the end of the ranking, the ranking unit 135 notifies the operation status determination unit 136 of the rank of each of the information processing units 100. The operation status determination unit 136 then changes the operation status of each of the information processing units 100 according to the notified rank to operate the information processing unit 100 in the power saving mode. At this time, the operation status determination unit 136 changes the operation status so that the lower the unit's rank is, the lower the unit's power consumption becomes. It is possible that the operation status determination unit 136 may not change the operation status of each of the information processing units 100 having a high rank to the power saving mode; each of information processing units 100 of a high rank is enabled to keep the current operation status as is. Whether to change the operation status of the information processing unit 100 or not is determined by taking into consideration the power supply capability of the power supply apparatus 1. For example, the information processing units 100 in the ranks 1 to 3 may be kept in the current operation status and the operation status of the information processing units 100 in the rank 4 and under may be changed so that the lower the rank is, the lower the power consumption becomes.

Next, a description will be made for how the ranking unit 135 assigns the rank to each of the information processing units 100 according to the power consumption and the priority with reference to FIG. 6B. The assignment made by the ranking unit 135 is a priority-oriented.

The first selection unit 1350 selects the second category and extracts each of the information processing units 100 belonging to the top priority category. If there are a plurality of the information processing units 100 belonging to the same category, those information processing units 100 are extracted collectively. After that, the first selection unit 1350 notifies the second selection unit 1351 of the extracted information processing units 100. As shown in FIG. 6B, the first selection unit 1350 selects the "high priority" category denoting the top priority and extracts each of the information processing units 100 belonging to the category and notifies the second selection unit 1351 of the extracted information processing units 100.

Then, the second selection unit 1351 selects the first category in ascending order of the power consumption with respect to the information processing unit 100 notified form the first selection unit 1350, and extracts each of the information processing units 100 belonging to the selected first category as often as one first category is selected. If there are a plurality of the information processing units 100 belonging to the same category at that time, those information processing units 100 are extracted collectively. As shown in FIG. 6B, with respect to the information processing unit 100 extracted by the first selection unit 1350 and belonging to the "high priority" category, the second selection unit 1351 extracts each of the information processing units 100 step-by-step from the information processing units 100 belonging to the "high" category to the information processing units 100 belonging to "low" category.

The second selection unit 1351 notifies the ranking determination unit 1352 of the extracted information processing units 100 sequentially. If there are a plurality of the information processing units 100 belonging to the same category at that time, the second selection unit 1351 notifies those information processing units 100 collectively. As shown in FIG. 6B, the second selection unit 1351, upon the extraction of the information processing units 100 belonging to the "low" category, notifies the ranking determination unit 1352 of the extracted information processing units 100 before extracting the information processing units 100 belonging to the "medium" category.

The ranking determination unit 1352 assigns the rank to each of the information processing unit 100 in descending order of notification from the second selection unit 1351. As shown in FIG. 6B, the ranking determination unit 1352 assigns the top rank (rank 1) to each of the information processing units 100 belonging to both the "high priority" category and the "low" category.

After that, the ranking determination unit 1352 assigns ranks to the information processing units 100 in ascending order of the power consumption. Upon the notification from the second selection unit 1351 to the ranking determination unit 1352 of all the units 100 extracted by the first selection unit 1350, the second selection unit 1351 selects the next high second category ("medium priority" category) and extracts each of the information processing units 100 belonging to the selected second category. Then, the first selection unit 1350, the second selection unit 1351, and the ranking determination unit 1352 repeat the above mentioned process until the rank is given to every unit 100.

Upon the end of the ranking, the ranking unit 135 notifies the operation status determination unit 136 of the rank of each of the information processing units 100. The operation status determination unit 136 then changes the operation status of each of the information processing units 100 according to the notified rank to operate the information processing unit 100 in the power saving mode. At this time, the operation status determination unit 136 changes the operation status so that the lower the unit's rank is, the lower the unit's power consumption becomes. For example, the information processing units 100 in the rank 4 and under may be operated in the power saving mode and the operation status of the information processing units 100 in ranks 7 to 9 may be changed so that the power consumption becomes less than that of the information processing units in ranks 4 to 6. It is possible that the operation status determination unit 136 may keep the information processing units 100 of high ranks (rank 1 to 3, for example) in the current operation status without setting those information processing units 100 in the power saving mode. Whether to change the operation status of each of the information processing units 100 is determined by taking into consideration the power supply capability of the power supply apparatus 1. For example, the information processing units 100 in the ranks 1 to 3 may be kept in the current operation status and the operation status of the information processing units 100 of the rank 4 and under may be changed so that the lower the rank is, the lower the power consumption becomes.

By changing the operation status of each of the information processing units 100 according to both the power consumption and the priority such way, the power consumption can be adjusted more flexibly than changing the operation status according to only the power consumption.

The switching unit 137 switches between the power consumption-oriented ranking and the priority-oriented ranking. The ranking unit 135 assigns the rank to each of the information processing units 100 according to the switching unit 137. If the switching unit 137 switches to the power consumption-oriented ranking, the ranking unit 135 operates as shown in the exemplary example in FIG. 6A. If the switching unit 137 switches to the priority-oriented ranking, the ranking unit 135 operates as shown in the exemplary example in FIG. 6B.

Because the switching unit 137 switches the ranking operation such way, this exemplary embodiment can obtain the following effects. In some cases, it may be expected that each of the information processing units 100 belonging to both high priority category and high power consumption category is kept in the current operation status as long as possible and the processing performance of the information processing system 2 is kept as is. In such a case, if the switching unit 137 can switch the ranking operation of the ranking unit 135, power supply management can be made more flexibly.

Figure 8:
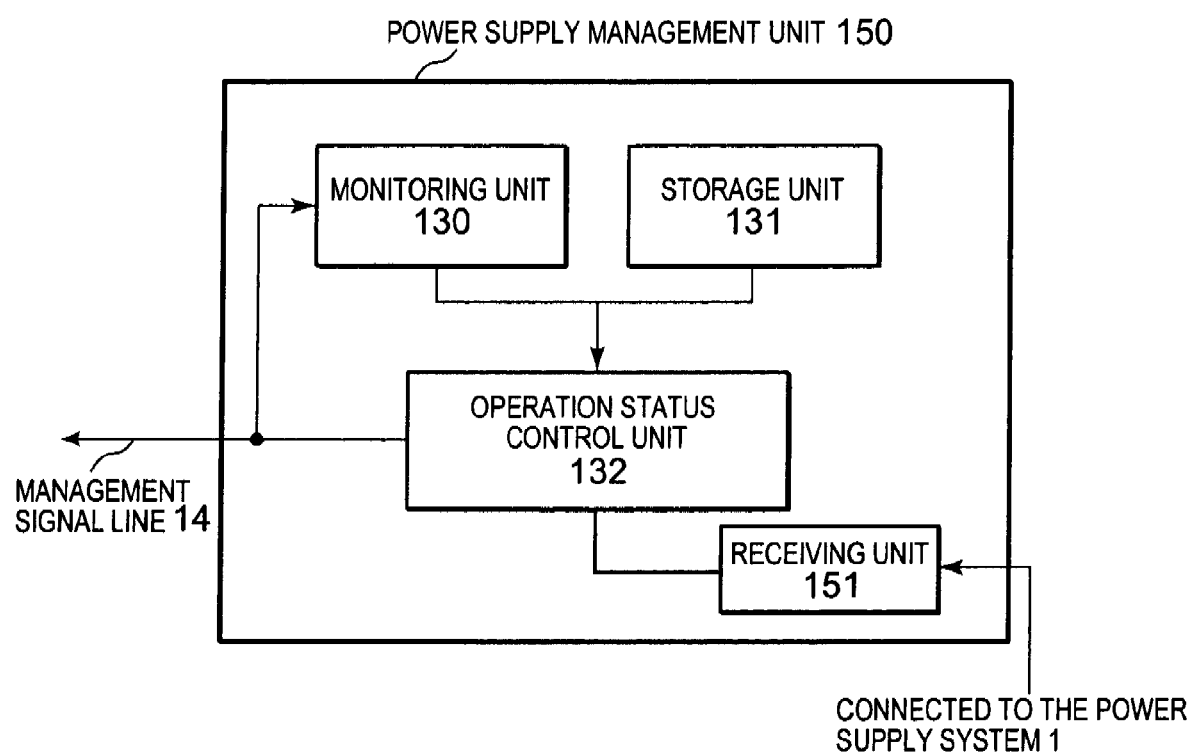
FIG. 8 is a block diagram of another configuration of the power supply management unit in the first exemplary embodiment of the present invention.

While the first exemplary embodiment of the present invention has been described according to the system shown in FIG. 1 as an example, the present invention can also be realized with any of the configurations shown in FIGS. 7 and 8.

FIGS. 7 and 8 show an example in which a power supply management unit 150 is provided for the management unit 15 of the information processing system 2 without providing the power supply management unit 13 for the power supply apparatus 1 as shown in FIG. 1. The management unit 15 operates independently of the information processing unit 100 and includes managing functions. For example, the managing functions are a turning on/off the power to each of the information processing units 100 and a starting up the operating system of the information processing unit 100.

The power supply management unit 150 of the management unit 15 includes a receiving unit 151 used to communicate with the power supply apparatus 1. Other components are the same as those of the power supply management unit 13 shown in FIGS. 2, 3, and 5.

Next, a description will be made for the operation of the first exemplary embodiment of the present invention with reference to the flowchart shown in FIGS. 9 and 10.

Figure 9:
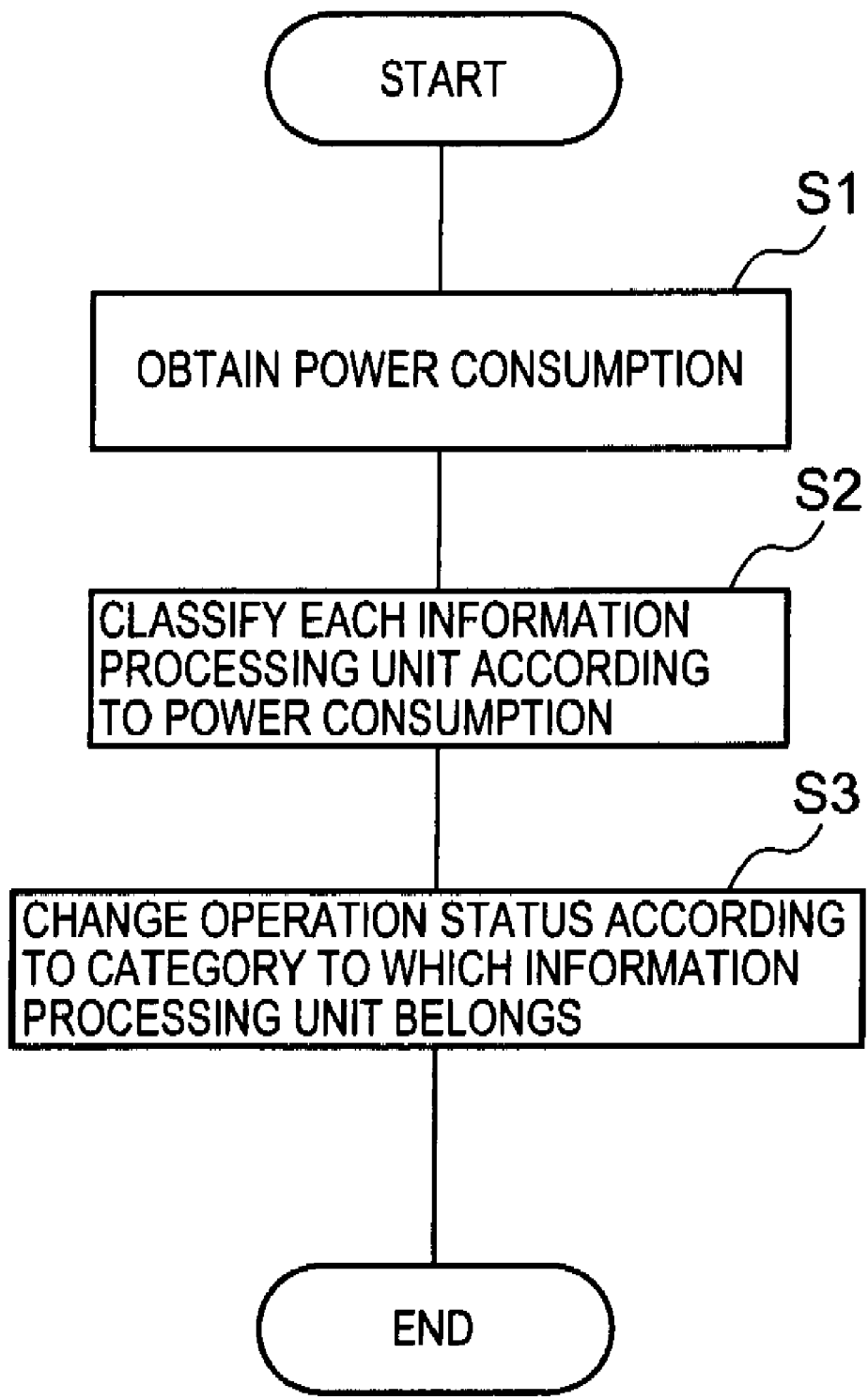
FIG. 9 is a flowchart of an operation of the first exemplary embodiment of the present invention.
Figure 10:
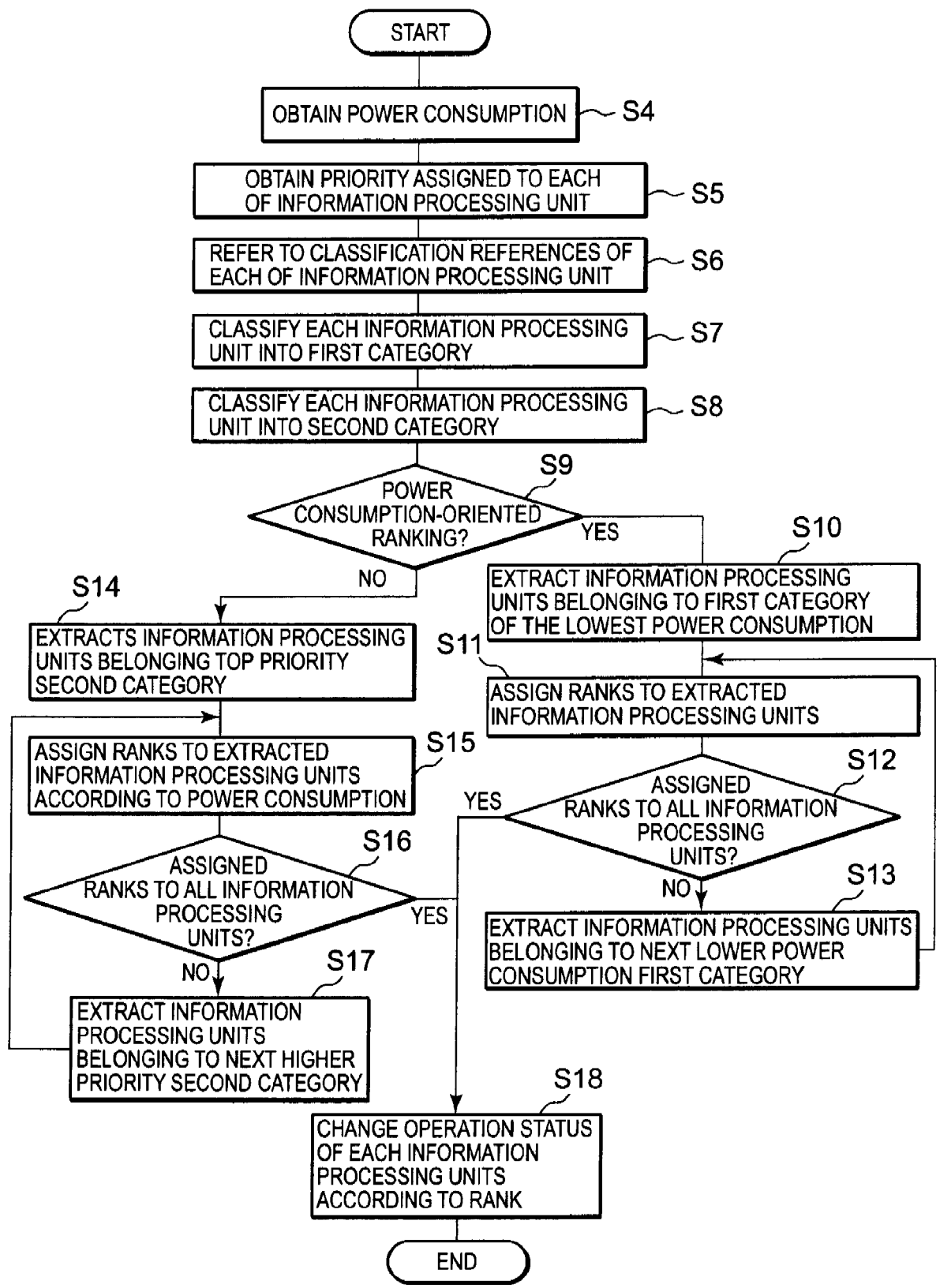
FIG. 10 is another flowchart of the operation of the first exemplary embodiment of the present invention.

FIG. 9 shows a case in which the operation status of each of the information processing units 100 is changed according to the power consumption.

At first, the monitoring unit 130 obtains the power consumption of each of the information processing units 100 from the status monitoring unit 101 at predetermined time intervals and notifies the operation status control unit 132 of the power consumption of each of the information processing units 100 (S1).

Then, the classification unit 134 compares the power consumption obtained by the monitoring unit 130 with the reference of the power consumption stored in the reference storing unit 133, and classifies each of the information processing unit 100 into the category according to the power consumption (S2).

The operation status determination unit 136 changes the operation status of the information processing unit 100 according to the category to which the information processing unit 100 belongs (S3). For example, operation status is changed so that each of the information processing units 100 is set in the power saving mode in descending order of power consumption to suppress the power consumption.

Next, a description will be made for a case in which the operation status of each of the information processing units 100 is changed according to both the priority and the power consumption with reference to FIG. 10.

At first, the monitoring unit 130 obtains the power consumption of each of the information processing units 100 from the status monitoring unit 101 at predetermined time intervals, and notifies the operation status control unit 132 of the power consumption (S4).

Then, the operation status control unit 132 obtains the priority of each of the information processing units 100 stored in the storage unit 131 (S5).

The classification unit 134 then refers to the reference of the power consumption and the reference of the priority stored in the reference storing unit 133 (S6).

The classification unit 134 then compares the power consumption obtained from the monitoring unit 130 with the reference of the power consumption to classify each of the information processing units 100 into the first category (S7) For example, the classification unit 134 determines one of the three power consumption categories ("high", "medium", and "low") to which each of the information processing units 100 belongs according to the reference of the power consumption.

The classification unit 134 then compares the priority obtained from the storage unit 131 with the reference of priority to classify each of the information processing units 100 into the second category (S8). For example, the classification unit 134 determines one of the three priority categories ("high", "medium", and "low") to which each of the information processing units 100 belongs according to the priority.

Therefore, each of the information processing units 100 can be classified into one of the two kinds of categories, that is, the first category according to the power consumption and the second category according to the priority.

The switching unit 137 switches whether the power consumption-oriented ranking or the priority-oriented ranking to change the operation status of each of the information processing units 100 (S9). For example, while each of the information processing units 100 is driven by the battery 11, if the remaining amount of the battery 11 is high, the switching unit 137 may select the priority-oriented ranking. If the remaining amount of the battery 11 is low, the switching unit 137 may select the power consumption-oriented ranking.

If the switching unit 137 selects the power consumption-oriented ranking (YES in S9), the first selection unit 1350 selects the first category of the lowest power consumption ("low" category, for example), and extracts each of the information processing units 100 belonging to the first category of the lowest power consumption (S10). Then, the first selection unit 1350 notifies the second selection unit 1351 of the extracted information processing unit 100.

The second selection unit 1351 selects the second category in descending order of the priority with respect to the information processing unit 100 notified form the first selection unit 1350, and extracts each of the information processing units 100 belonging to the selected second category as often as one second category is selected. The second selection unit 1351 then notifies the ranking determination unit 1352 of the extracted information processing unit 100. The processes are repeated until all the information processing units 100 extracted in S10 are notified to the ranking determination unit 1352. The ranking determination unit 1352 then assigns the rank to each of the information processing units 100 in order of notification from the second selection unit 1351 (S11).

Here, the ranking determination unit 1352 determines whether or not the ranking is completed for every information processing unit 100 existing in the information processing system 2 (S12).

If there is any information processing unit 100 that is not assigned the rank (NO in S12), the ranking determination unit 1352 instructs the first selection unit 1350 to select another first category of the next lower power consumption and to extract each of the information processing units 100 belonging to the selected first category (S13). After that, the ranking determination unit 1352 executes the process of S11. The process is repeated until the ranking is completed for every information processing unit 100 existing in the information processing system 2.

If the ranking is completed for every information processing unit 100 existing in the information processing system 2 (YES in S12), the operation status determination unit 136 changes the operation status of each of the information processing units 100 according to the rank, thereby adjusting the power consumption of each unit 100 (S18). For example, the operation status may be changed so that the lower the rank is, the lower the power consumption becomes. Each of the information processing units 100 may be set in the power saving mode.

If the switching unit 137 selects the priority-oriented ranking (NO in S9), the first selection unit 1350 selects the top priority second category, and extracts each of the information processing units 100 belonging to the selected second category (S14). Then, the first selection unit 1350 notifies the second selection unit 1351 of the extracted information processing unit 100.

The second selection unit 1351 selects the first category in ascending order of the power consumption with respect to the information processing unit 100 notified form the first selection unit 1350, and extracts each of the information processing units 100 belonging to the selected first category as often as one first category is selected. The second selection unit 1351 then notifies the ranking determination unit 1352 of the extracted information processing unit 100. The process is repeated until all the information units 100 extracted in S14 are notified to the ranking determination unit 1352. The ranking determination unit 1352 assigns the rank to each of the information processing unit 100 in order of notification from the second selection unit 1351 (S15).

Here, the ranking determination unit 1352 determines whether or not the ranking is completed for every information processing unit 100 existing in the information processing system 2 (S16).

If there is any information processing unit 100 that is not assigned the rank (NO in S16), the ranking determination unit 1352 instructs the first selection unit 1350 to select another second category of the next higher priority and to extract each of the information processing units 100 belonging to the selected second category (S17). After that, the ranking determination unit 1352 executes the process of S15. The process is repeated until the ranking is completed for every information processing unit 100 existing in the information processing system 2.

If the ranking is completed for every information processing unit 100 existing in the information processing system 2 (YES in S16), the operation status determination unit 136 changes the operation status of each of the information processing unit 100 according to the assigned rank, thereby adjusting the power consumption of each unit 100 (S18). For example, the operation status may be changed so that the lower the rank of each of the information processing units 100 is, the less the power consumption becomes. Each of the information processing units 100 may be set in the power saving mode.

Next, a second exemplary embodiment of the present invention will be described with reference to FIGS. 11, 12, and 13.

Figure 11:
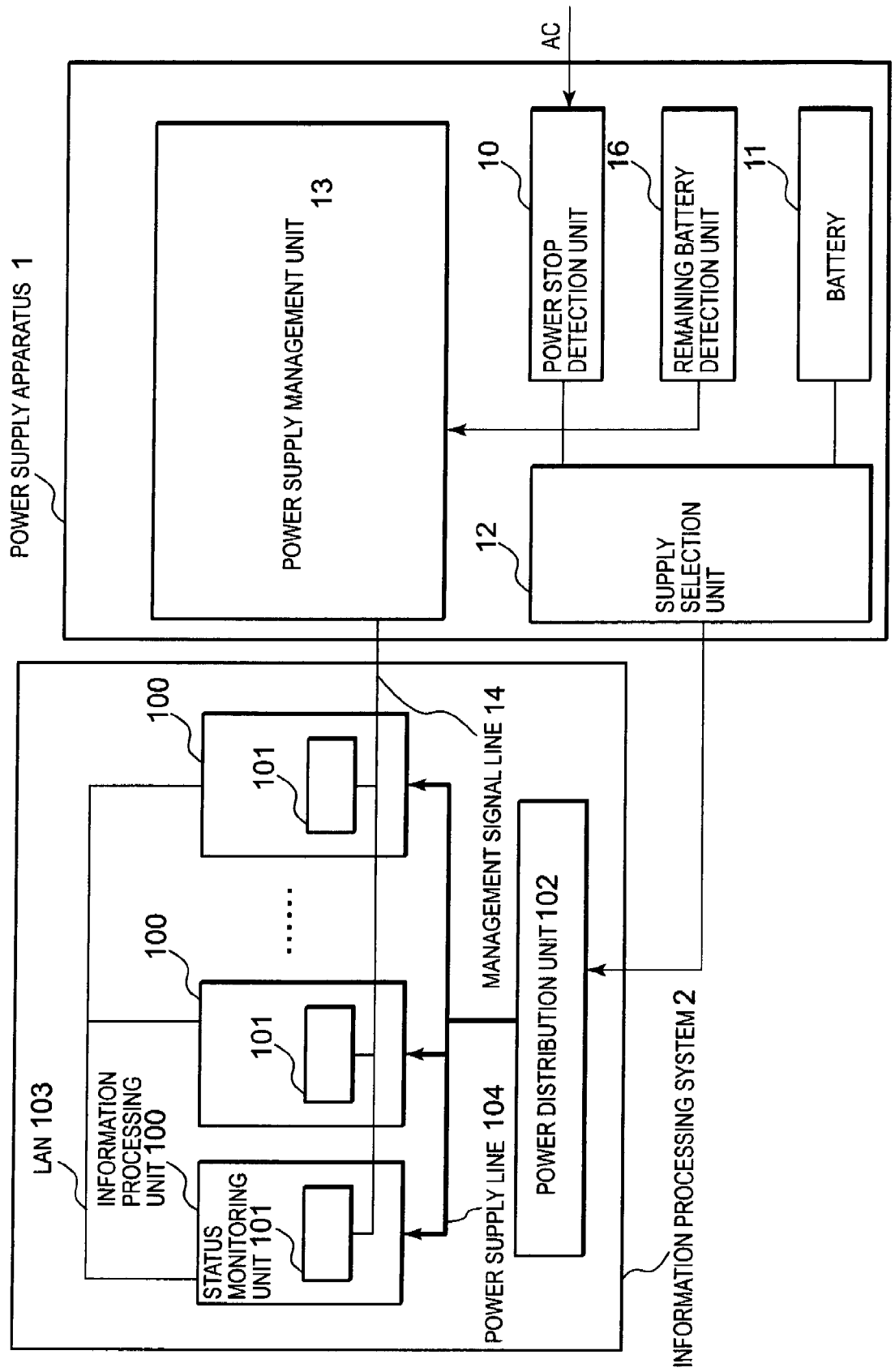
FIG. 11 is a block diagram of a configuration of a system in a second exemplary embodiment of the present invention.
Figure 12:
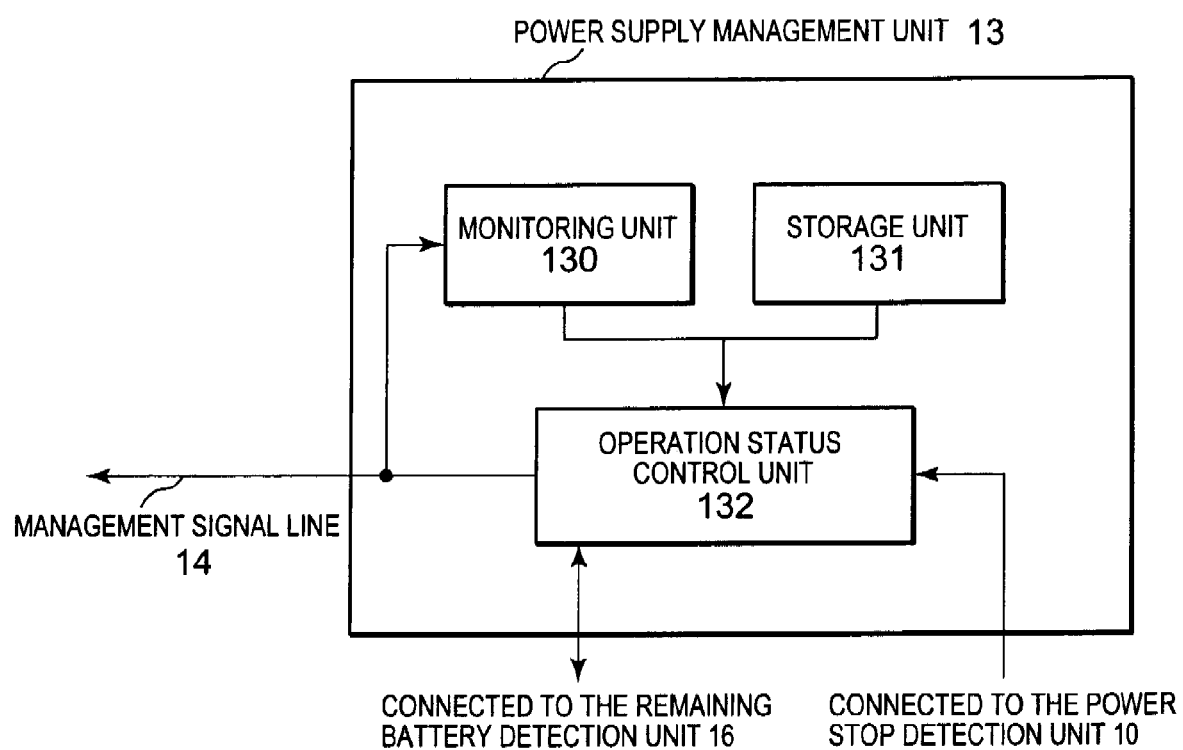
FIG. 12 is a block diagram of a power supply management unit in the second exemplary embodiment of the present invention.

FIG. 11 shows a configuration of the second exemplary embodiment of the present invention. The power supply apparatus 1 in this second exemplary embodiment further includes a battery remaining detection unit 16. This addition of the battery remaining detection unit 16 is only a difference from the first exemplary embodiment; others are the same in both first and second exemplary embodiments. As shown in FIG. 12, the battery remaining detection unit 16 is connected to the operation status control unit 132.

In this second exemplary embodiment of the present invention, in case where the power supply to the power supply apparatus 1 stops and the battery 1 supplies a power to the power supply apparatus 1, the operation status of each of the information processing units 100 determined by the operation status determination unit 136 is further adjusted according to the remaining amount of the battery 11 detected by the battery remaining detection unit 16.

Figure 13:
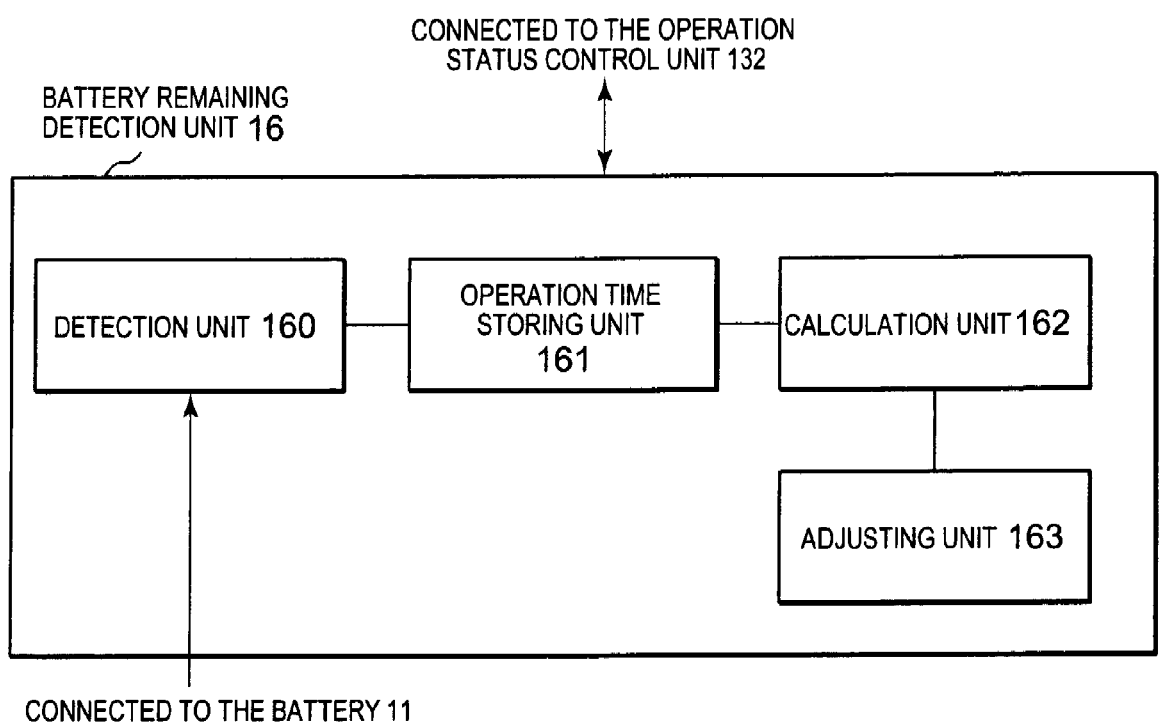
FIG. 13 is a block diagram of a residual battery level detection unit in the second exemplary embodiment of the present invention.

As shown in FIG. 13, the battery remaining detection unit 16 includes a detection unit 160, a operation time storing unit 161, a calculation unit 162, and an adjusting unit 163.

The detection unit 160 detects the remaining amount of the battery 11 as a power value (Wh). The detection unit 160 detects the remaining amount of the battery 11 at predetermined time intervals.

The operation time storing unit 161 stores a operation time denoting a time required to continue the operation of the information processing unit 100 on the remaining amount of the battery 11 detected by the detection unit 160. As shown in FIG. 14, the operation time storing unit 161 stores a required operation time for each of the remaining amount of the battery 11. The required operation time may be preset or set while the power supply apparatus 1 is operating.

The calculating unit 162 calculates a possible operation time from the total power consumption of the plurality of the information processing units 100 obtained by the monitoring unit 130 and the remaining amount of the battery 11 detected by the detection unit 160. The possible operation time denotes that the information processing units 100 can be driven by the battery 11 during the possible operation time. For example, the possible operation time is obtained by diving the remaining amount (Wh) of the battery 11 by the total power consumption of all the information processing units 100. For example, in case where the remaining amount of the battery 11 is 400 (Wh) and the total power consumption is 950 (W), the possible operation time is 400/950=0.42 (h).

The adjusting unit 163 compares the required operation time read from the operation time storing unit 161 with the possible operation time. And if the possible operation time is less than the required operation time, the adjusting unit 163 further adjusts the operation status of each of the information processing units 100, determined by the operation status determination unit 136. The adjusting unit 163 executes an operation for further adjusting the operation status of each of the information processing units 100 each time the detection unit 160 detects the remaining amount of the battery 11 at predetermined time intervals. The adjusting unit 163 adjusts the operation status of each of the information processing units 100 in turn from the lower ranked information processing unit 100. As shown in FIG. 6A, the operation status of the information processing unit 100 in the ranks 1 to 9 are adjusted as follows. At first, the adjusting unit 163 adjusts the operation status of each of the information processing units 100 ranked at the lowest 9. For example, the adjusting unit 163 is just required to lower the operation frequency of each of the information processing unit 100. Then, the adjusting unit 163 recalculates the possible operation time from the total power consumption obtained after the operation status of the information processing unit 100 ranked 9 is adjusted and the remaining amount of the battery 11. If the possible operation time is over the required operation time, the adjusting unit 163 exits the adjustment process. If the possible operation time is still under the required operation time, the adjusting unit 163 further changes the operation status of each of the information processing units 100 in the next lower rank 8. The adjusting unit 163 repeats this process until the possible operation time exceeds the required operation time. If the possible operation time does not exceed the required operation time even after the adjustment of the operation status of each of the information processing units 100 in the top rank 1, the adjusting unit 163 is just required to shut down each of the information processing units 100 preferentially from those in the lowest rank 9.

Figure 15:
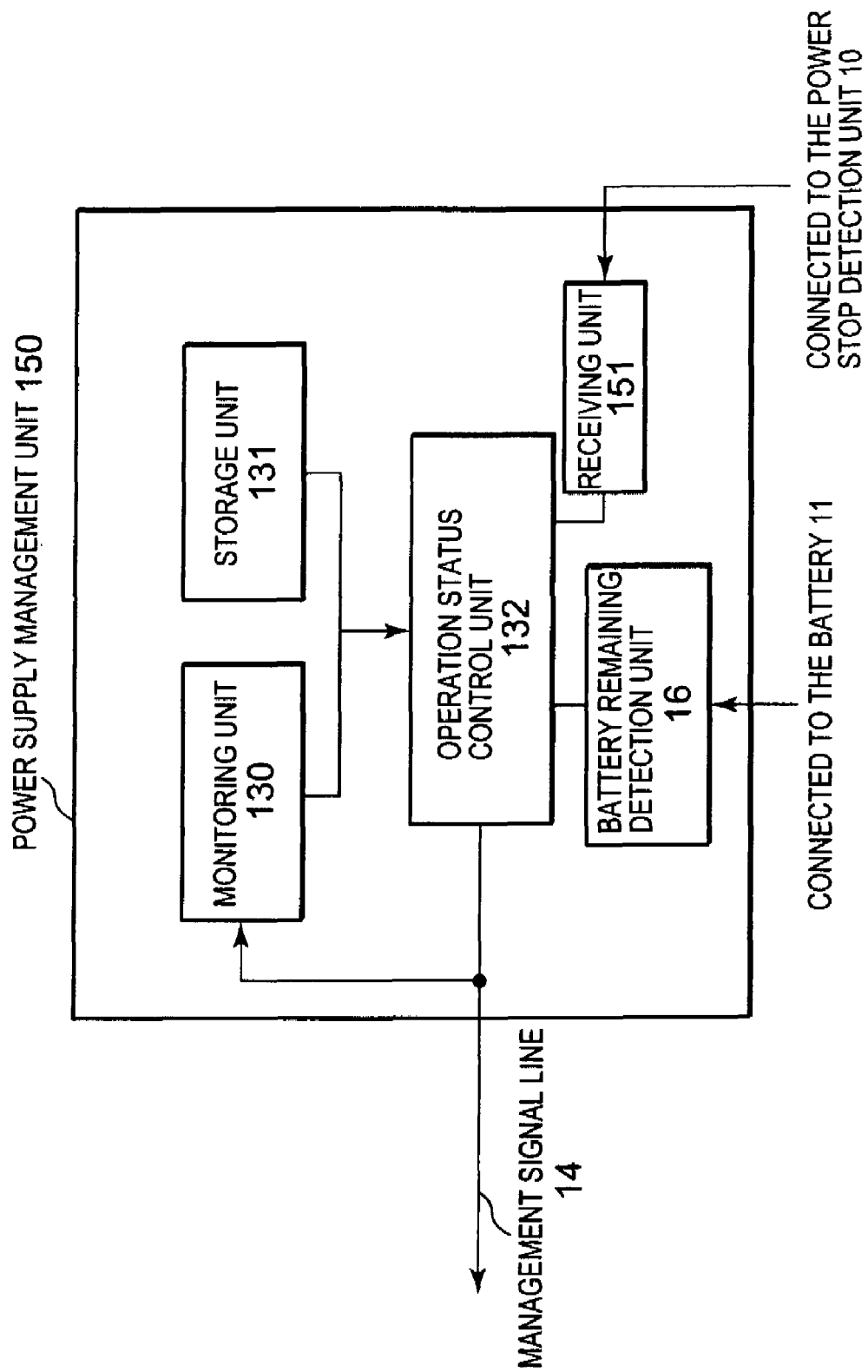
FIG. 15 is a block diagram of another configuration of the power supply management unit in the second exemplary embodiment of the present invention.

While the second exemplary embodiment of the present invention has been described by picking up the system shown in FIG. 11 as an example, the second exemplary embodiment can also be realized in another system that provides a power supply management unit 150 for the management unit 15 of the information processing system 2 without providing the power supply management unit 13 for the power supply apparatus 1. In this case, the power supply management unit 150 in the management unit 15 as shown in FIG. 15 comes to include the battery remaining detection unit 16. In case where the battery remaining detection unit 16 is provided for the power supply management unit 150 in the management unit 15, the configuration and the operation of the battery remaining detection unit 16 are the same as those shown in FIG. 13.

By adjusting the operation status of each of the information processing units 100 by taking into consideration the remaining amount of the battery 11 such way, the second exemplary embodiment can obtain an excellent effect that the power supply to the information processing system 2 can be managed more flexibly in case where the power supply apparatus 1 supplies the power with finite power of the battery 11.

Figure 16:
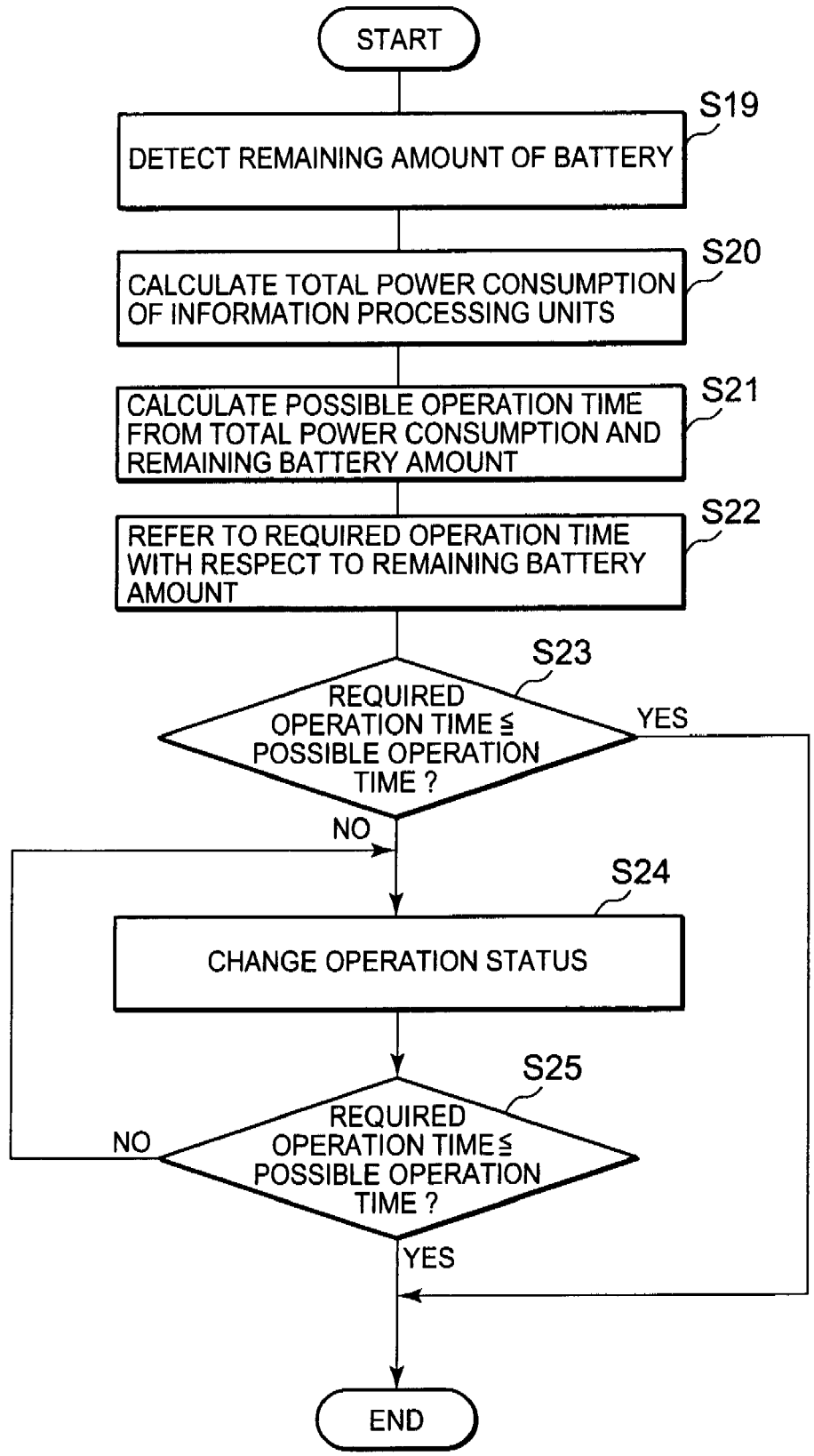
FIG. 16 is a flowchart of an operation of the second exemplary embodiment of the present invention.

Next, a description will be made for the operation of the second exemplary embodiment of the present invention with reference to a flowchart shown in FIG. 16. This flowchart shows operations to be executed after the operation status determination unit 136 determines the operation status of each of the information processing units 100 once.

The detection unit 160 detects the remaining amount of the battery 11 as the power (Wh) (S19).

The calculation unit 162 calculates a total value of the power consumption of a plurality of the information processing units 100 obtained by the monitoring unit 130 (S20).

The calculation unit 162 then calculates the possible operation time from the total power consumption and the remaining amount of the battery 11 (S21). For example, the calculation unit 612 calculates the possible operation time by dividing the remaining amount (Wh) of the battery 11 by the total power consumption of the information processing units 100. For example, if the remaining amount of the battery 11 is 400 (Wh) and the total power consumption is 950 (W), the possible operation time is 400/950=0.42 (h).

The adjusting unit 163 refers to the required operation time corresponding to the remaining amount of the battery 11 stored in the operation time storing unit 161 (S22).

The adjusting unit 163 then compares the required operation time with the possible operation time (S23).

If the possible operation time exceeds the required operation time (YES in S23), the adjusting unit 163 exits the process without adjusting the operation status.

If the possible operation time is under the required operation time (NO in S23), the adjusting unit 163 further changes the operation status of the information processing unit 100 determined by the operation status determination unit 136 (S24).

After the step of S24, the adjusting unit 163 instructs the calculation unit 162 to recalculate the possible operation time from the total power consumption assumed after the adjustment of the operation status and the remaining amount of the battery 11. Then, the adjusting unit 163 compares the recalculated possible operation time with the required operation time (S25) again.

If the possible operation time is still under the required operation time even after the adjustment of the operation status (NO in S25), the adjusting unit 163 executes the process of S24 again to adjust the operation status of each of the information processing units 100.

If the possible operation time exceeds the required operation time (YES in S25), the adjusting unit 163 exits the process.

As described above, by changing the operation status of each of the information processing units 100 according to its power consumption, thereby adjusting its power consumption, the present invention can obtain an excellent effect that the operation of each of the information processing units 100 can be supplied a power and continued to operate without a break as long as possible.

While the invention has been particularly shown and described with reference to exemplary embodiments thereof, the invention is not limited to these embodiments. It will be understood by those of ordinary skill in the art that various changes in form and details may be made there in without departing from the spirit and scope of the present invention as defined by the claims.

What is claimed is:

1. An apparatus connected to a plurality of units, said units including monitors, respectively, each of which monitors power consumption of the corresponding one of said units, the apparatus comprising:
    a management unit which changes operation statuses of each of said units according to said power consumption obtained from the corresponding one of said monitors, within every operating range of said units,
    wherein said management unit assigns a rank to each of said units according to said power consumption and a priority of each of said units, and
    wherein said management unit changes said operation statuses of each of said units according to said rank,
    wherein the apparatus further comprises:
    a battery which supplies a power to each of said units when a power supply to said apparatus stops; and
    a battery remaining detection unit which detects a remaining amount of said battery, and adjusts said operation statuses changed by said management unit according to said remaining amount.

2. The apparatus according to claim 1, wherein said management unit comprises:
    a monitoring unit which obtains said power consumption of each of said units from the corresponding one of said monitors; and
    an operation status control unit which changes said operation statuses of each of said units according to said power consumption, within every operation range of said units.

3. The apparatus according to claim 2, wherein said operation status control unit comprises:
    a reference storing unit which stores a reference used for classifying said units into a category defined on the basis of said power consumption;
    a classification unit which compares each of said power consumption obtained from each of said monitors with said reference, and classifies each of said units into said category according to a result of comparison; and
    an operation status determination unit which changes said operation statuses of each of said units on the basis of said category into which each of said units is classified.

4. The apparatus according to claim 1, wherein said management unit changes said operation statuses of each of said units according to said power consumption obtained from the corresponding one of said monitors and said priority within every operation range of said units, said priority denoting a necessity level to maintain a current operation status for each of said units.

5. The apparatus according to claim 4, wherein said management unit comprises:
    a monitoring unit which obtains said power consumption of each of said units from the corresponding one of said monitors;
    a storage unit which stores said priority of each of said units; and
    an operation status control unit which assigns said rank to each of said units according to said power consumption and said priority, and changes said operation statuses of each of said units according to said rank, within every operation range of said units.

6. The apparatus according to claim 5, wherein said operation status control unit comprises:
    a reference storing unit which stores a first reference for classifying each of said units according to said power consumption and a second reference for classifying each of said units according to said priority;
    a classification unit which classifies each of said units into a first category according to said power consumption and said first reference, and classifies each of said units into a second category according to said priority and said second reference;
    a ranking unit which assigns the rank to each of said units according to said first and second categories into which each of said units are classified; and
    an operation status determination unit which changes said operation statuses of each of said units according to said rank, within every operation range of said units.

7. The apparatus according to claim 6, wherein said ranking unit comprises:
    a first selection unit which selects said unit belonging to said first category in the order of ascending power consumption corresponding to said first category;

a second selection unit which selects said unit belonging to said second category in the order of descending priority corresponding to said second category;

wherein said first selection unit notifies said second selection unit of the selected unit as often as said first selection unit selects said unit belonging to a certain first category, and said second selection unit selects said unit notified from said first selection unit; and a ranking determination unit which assigns a higher rank to said unit in the order of selection by said second selection unit.

8. The apparatus according to claim 6, wherein said ranking unit comprises:

a first selection unit which selects said unit belonging to said second category in the order of descending priority corresponding to said second category;

a second selection unit which selects said unit belonging to said first category in the order of ascending power consumption corresponding to said first category;

wherein said first selection unit notifies said second selection unit of the selected unit as often as said first selection unit selects said unit belonging to a certain second category, and said second selection unit selects said unit notified from said first selection unit; and a ranking determination unit which assigns a higher rank to said unit in the order of selection by said second selection unit.

9. The apparatus according to claim 1, said battery remaining detection unit comprises:

a detection unit which detects said remaining amount of said battery;

an operation time storing unit which stores a required operation time denoting a time required to continue an operation of each of said units on said remaining amount detected by said detection unit;

a calculation unit which calculates a possible operation time for enabling each of said units to be driven by said battery from said power consumption of each of said units and said remaining amount detected by said detection unit; and an adjusting unit which adjusts said operation statuses changed by said management unit so that said possible operation time exceeds said required operation time when said possible operation time is under said required operation time.

10. A system comprising:

a plurality of units each of which include a monitor for monitoring power consumption of the corresponding one of said units;

an apparatus which is connected to each of said units;

said apparatus comprising:

a management unit which changes operation statuses of each of said units according to said power consumption obtained from the corresponding one of said monitors, within every operation range of said units, wherein said management unit assigns a rank to each of said units according to said power consumption and a priority of each of said units, and wherein said management unit changes said operation statuses of each of said units according to said rank, wherein the system further comprises:

a power supply unit which supplies a power to each of said units;

said power supply comprising:

a battery which supplies a power to each of said units when said power supply unit stops supplying said power; and a battery remaining detection unit which detects a remaining amount of said battery, and adjusts said operation statuses changed by said management unit according to said remaining amount.

11. The system according to claim 10, wherein said management unit comprises:

a monitoring unit which obtains said power consumption of each of said units from the corresponding one of said monitors; and an operation status control unit which changes said operation statuses of each of said units according to said power consumption, within every operation range of said units.

12. The system according to claim 11, wherein said operation status control unit comprises:

a reference storing unit which stores a reference used for classifying said units into a category defined on the basis of said power consumption;

a classification unit which compares each of said power consumption obtained from each of said monitors with said reference, and classifies each of said units into said category according to a result of comparison; and an operation status determination unit which changes said operation statuses of each of said units on the basis of said category into which each of said units is classified.

13. The system according to claim 10, wherein said apparatus connects to a plurality of said units; and wherein said management unit changes said operation statuses of each of said units according to said power consumption obtained from the corresponding one of said monitors and said priority within every operation range of said units, said priority denoting a necessity level to maintain a current operation status for each of said units.

14. The system according to claim 13, wherein said management unit comprises:

a monitoring unit which obtains said power consumption of each of said units from the corresponding one of said monitors;

a storage unit which stores said priority of each of said units; and an operation status control unit which assigns said rank to each of said units according to said power consumption and said priority, and changes said operation status of each of said units according to said rank, within every operation range of said units.

15. The system according to claim 10, wherein said battery remaining detection unit comprises:

a detection unit which detects said remaining amount of said battery;

an operation time storing unit which stores a required operation time denoting a time required to continue an operation of each of said units on said remaining amount of said battery detected by said detection unit;

a calculation unit which calculates a possible operation time for enabling each of said units to be driven by said battery from said power consumption of each of said units and said remaining amount detected by said detection unit; and an adjusting unit which adjusts said operation statuses changed by said management unit so that said possible operation time exceeds said required operation time when said possible operation time is under said required operation time.

16. A method for controlling an apparatus connected to a plurality of units, said units including monitors, respectively, each of which monitors power consumption of the corresponding one of said units, the method comprising:

obtaining said power consumption from the corresponding one of said monitors;

changing operation statuses of each of said units according to said power consumption obtained from the corresponding one of said monitors, within every operation range of said units;

assigning a rank to each of said units according to said power consumption and a priority of each of said units;

changing said operation statuses of each of said units according to said rank, detecting a remaining amount of a battery which supplies a power to each of said units when a power supply to said apparatus stops; and adjusting said operation statuses according to said remaining amount of said battery.

17. The method according to claim 16, further comprising:

comparing said power consumption with a reference for classifying each of said units into a category defined on the basis of said power consumption classifying each of said units into said category; and changing said operation statuses on the basis of said category into which each of said units is classified.

18. The method according to claim 16, further comprising:

obtaining said priority from a storage unit for storing said priority, said priority denoting a necessity level to maintain a current operation status for each of said units; and changing said operation statuses according to said rank, within every operation range of said units.

19. The method according to claim 18, further comprising:

obtaining a first reference for classifying each of said units according to said power consumption and a second reference for classifying each of said units according to said priority, from a reference storing unit;

classifying each of said units into a first category according to said power consumption and said first reference;

classifying each of said units into a second category according to said priority and said second reference;

assigning the rank to each of said units according to said first and second categories; and changing said operation statuses of each of said units according to said rank, within every operation range of said units.

* * * * *